US007001635B2

(12) United States Patent
Merritt, II et al.

(10) Patent No.: US 7,001,635 B2
(45) Date of Patent: Feb. 21, 2006

(54) PROCESS FOR IMPROVING SMOKY COLOR OF AN ENCASED FOOD PRODUCT

(75) Inventors: Frederick M. Merritt, II, Lockport, IL (US); Myron D. Nicholson, Lemont, IL (US); Paul E. DuCharme, Jr., Tinley Park, IL (US)

(73) Assignee: Viskase Corporation, Willowbrook, IL (US)

( * ) Notice: Subject to any disclaimer, the term of this patent is extended or adjusted under 35 U.S.C. 154(b) by 505 days.

(21) Appl. No.: 10/417,006

(22) Filed: Apr. 16, 2003

(65) Prior Publication Data

US 2003/0207002 A1 Nov. 6, 2003

Related U.S. Application Data

(60) Provisional application No. 60/377,655, filed on May 6, 2002.

(51) Int. Cl.
*A22C 11/00* (2006.01)
*A22C 13/00* (2006.01)

(52) U.S. Cl. .................. 426/412; 426/105; 426/135; 426/413

(58) Field of Classification Search ............... 426/105, 426/135, 412, 413
See application file for complete search history.

(56) References Cited

U.S. PATENT DOCUMENTS

| 1,631,723 | A | | 6/1927 | Freund |
| 2,179,181 | A | | 11/1939 | Graenacher et al. |
| 2,477,767 | A | | 8/1949 | Remer |
| 2,477,768 | A | | 8/1949 | Remer |
| 2,521,101 | A | | 9/1950 | Thor et al. |
| 2,984,574 | A | | 5/1961 | Matecki |
| 3,451,827 | A | | 6/1969 | Bridgeford |
| 3,454,981 | A | | 7/1969 | Martinek |
| 3,454,982 | A | | 7/1969 | Arnold |
| 3,461,484 | A | | 8/1969 | Arnold |
| 3,898,348 | A | | 8/1975 | Chiu et al. |
| 3,988,804 | A | | 11/1976 | Regner et al. |
| 4,137,947 | A | | 2/1979 | Bridgeford |
| 4,356,218 | A | | 10/1982 | Chiu et al. |
| 4,442,868 | A | | 4/1984 | Smith |
| 4,504,501 | A | * | 3/1985 | Nicholson .................. 426/284 |
| 4,511,613 | A | | 4/1985 | Nicholson et al. |
| 4,540,613 | A | | 9/1985 | Nicholson et al. |
| 4,818,551 | A | | 4/1989 | Stall et al. |
| 4,889,751 | A | * | 12/1989 | Hansen et al. ............. 428/34.8 |
| 4,933,217 | A | * | 6/1990 | Chiu ........................ 428/34.8 |
| 5,230,933 | A | * | 7/1993 | Apfeld et al. .............. 428/34.8 |
| 5,690,977 | A | | 11/1997 | Hammer |
| 6,153,234 | A | | 11/2000 | Kobussen |

FOREIGN PATENT DOCUMENTS

JP 08242817 A 9/1996

OTHER PUBLICATIONS

Patent Abstracts of Japan, vol. 1997, No. 01, Jan. 31, 1997.
European Search Report for EP 03 25 2793, dated Aug. 22, 2003.

* cited by examiner

*Primary Examiner*—Arthur L. Corbin
(74) *Attorney, Agent, or Firm*—Donna Bobrowicz

(57) ABSTRACT

The present invention relates to a method for enhancing the smoky color and flavor of foodstuffs, such as sausages, produced in casing containing liquid smoke, by exposing the encased foodstuff to a alkaline solution. Peeling of the sausages is also enhanced.

38 Claims, No Drawings

PROCESS FOR IMPROVING SMOKY COLOR OF AN ENCASED FOOD PRODUCT

This application claims the benefit of U.S. Provisional Application Ser. No 60/377,655, filed May 6, 2002.

The present invention relates to a method for enhancing the smoky color and flavor of food products, such as sausages, produced in casing that contains liquid smoke, by exposing the encased food product to an alkaline drenching solution. It also relates to products made in casing that does not contain liquid smoke, but which are first drenched in liquid smoke, and later exposed to an alkaline drenching solution.

BACKGROUND OF THE INVENTION

Sausages are made by preparing a meat emulsion, as for frankfurters, or a ground meat mixture, or even a meat and vegetable, such as soy beans, or just a vegetable mixture, and stuffing it into a casing. To get a smoky taste and color, these encased or peeled sausages are smoked with gaseous or liquid wood smoke, by dipping them into a bath of liquid smoke, by spraying or drenching encased sausages with a casing permeable liquid smoke prior to thermal processing. Another way is to use casings that have their interior surfaces coated with a liquid smoke, which color transfers to the sausage filling during the processing cycle.

Frankfurters span a range of colors, from a very light red to a much darker one, depending on where they are sold. Sausages made of coarsely ground meat, such as polish sausages, tend to have a more intense reddish color than does the average frankfurter, but they also come in a range of colors. Each smoked product has its own standards for smoky color and taste.

Differences in color can also be seen in products processed in casings or casing-like mediums, such as sealed bags, which contain whole muscle meats, such as hams or chicken breasts, and cheeses, and that are smoked while inside the casings.

Food casings used in the processed food industry are generally thin-walled tubing of various diameters, typically prepared from cellulose using a number of different processes. Although the vast majority of casings are basically colorless, some do contain coloring agents which transfer to the encased foodstuff upon processing.

In general, food casings are stuffed with foodstuffs such as sausage meats or meat emulsions, and are then heat processed. During the cooking and further processing, if the casing contains a transferable color on its inner surface, color is transferred to the encased foodstuff, thereby coloring the surface of the finished product. After processing, these casings are removed prior to final packaging. These skinless sausages are generally processed in nonfiber-reinforced ("nonfibrous") cellulose casing. The term "nonfibrous" is used here to mean without use of fiber reinforcement (e.g., a paper tube) in the casing and nonfibrous is most commonly understood in the art to refer to casings without paper or a previously bonded fiber reinforcement. Nonfibrous casings are typically used to process small diameter sausages including polish sausages, wieners, or frankfurters. However, larger diameter sausages such as salami are frequently sold with the casing left on. These sausages are usually packaged in fiber-reinforced (fibrous) cellulosic or nylon casing.

In one well known method of manufacturing of nonfibrous, self-coloring or smoked cellulose sausage casings, viscose is typically extruded through an annular die into a coagulating and regenerating bath to produce a tube of regenerated cellulose. In another method, cellulose is dissolved by a tertiary amine oxide and later, the cellulose is precipitated to form a film or filament, as described in U.S. Pat. No. 2,179,181. This tube is subsequently washed, plasticized, e.g., with glycerine, impregnated with a water-soluble, casing-permeable colorant and dried by inflation under substantial air pressure. After drying, the self-coloring casing is wound on reels and subsequently shirred on high-speed shirring machines, such as those described in U.S. Pat. Nos. 2,984,574; 3,451,827; 3,454,981; 3,454,982; 3,461,484; 3,988,804 and 4,818,551. In the shirring process, typically lengths of from about 40 to about 200 or more feet of casing are compacted (shirred) into tubular sticks of between about 4 and about 30 inches. These shirred casing sticks are packaged and provided to the meat processor who typically causes the casing sticks to be deshirred at extremely high speeds while stuffing the deshirred casing with a meat emulsion. The meat can be subsequently cooked or pasteurized and the casing removed from the meat processed therein with high-speed peeling machines. The resulting peeled sausage is colored by the colorants, such as FD&C dyes, that have transferred from the casing to the surface of the sausage during cooking or pasteurization.

Colorless nonfibrous casings are made in a similar fashion, but without the color additive steps. Smoked foodstuffs may be produced using the clear casings by exposing either the encased or released foodstuff to a liquid smoke solution by drenching, spraying or showering the liquid smoke on the encased or released foodstuff.

For fibrous casing, a process of manufacture similar to that for nonfibrous casing is employed. The viscose is extruded onto one or both sides of a tube formed by folding a web of paper so that the opposing side edges overlap. The viscose impregnates the paper tube and upon coagulation and regeneration of the viscose, a fiber-reinforced tube of regenerated cellulose is produced. Liquid smoke or other colorants may be introduced to the fibrous casing generally by slugging, spraying, drenching or dipping. Fibrous casing is able to absorb much greater amounts of colorants than is nonfibrous casing, due to the additional reinforcing material used in the casing. These colorants or flavorants then transfer to the surface of the product prepared inside the fibrous casing.

Production of both nonfibrous and fibrous casing is well-known in the art and the present invention may utilize such well known processes and casings.

Cellulosic casings are typically humidified to a level sufficient to allow the casing to be shirred without undue breakage from brittleness, yet humidification must be at a level low enough to prevent undue sticking of the casing to the shirring equipment, e.g., the mandrel, during the shirring operation. Often a humectant is employed to moderate the rate of moisture take-up and casing swelling, to produce a casing that during the shirring operation has sufficient flexibility without undue swelling or stickiness. Typically, a lubricant such as an oil will also be used to facilitate passage of the casing through the shirring equipment, e.g. over a shirring mandrel.

It has been useful to lubricate and internally humidify cellulose casings during the shirring process by spraying a mist of water and a stream of lubricant through the shirring mandrel. This is an economical, fast and convenient way to lubricate and/or humidify the casing to increase the flexibility of the casing and facilitate high speed shirring without undue detrimental sticking, tearing or breakage of the casing. Additional components, such as coloring agents, liquid smoke, peeling aids, etc., may be added to the shirring solution, and thereby introduced into the interior of the casing.

In the formation of cellulosic casing an extruded cellulosic film forms what is known as gel stock casing having a high moisture content in excess of 100 wt. %. This gel stock casing is unsuitable for stuffing with food such as meat emulsion, e.g. to form sausages, because it has insufficient strength to maintain control of stuffing diameter and prevent casing failure due to bursting while under normal stuffing pressure. Gel stock casing is typically dried to a moisture level well below 100 wt. %, which causes the cellulose to become more dense with increased intermolecular bonding (increased hydrogen bonding). The moisture level of this dried casing may be adjusted, e.g., by remoisturization, to facilitate stuffing.

In the formation of skinless frankfurters where the casing is removed after processing, sausage proteins coagulate, particularly at the sausage surface, to produce a skin and allow formation of a liquid layer between this formed skin and the casing as described in U.S. Pat. No. 1,631,723 (Freund). In the art, the term "skinless frankfurter" is understood to mean that the casing is or is intended to be removed and that such casing may be removed because of formation of a secondary "skin" of coagulated proteins on the surface of the frankfurter. This secondary skin forms the outer surface of the so called "skinless frankfurters". Skin formation is known to be produced by various means including the traditional smoke curing with gaseous smoke, low temperature drying, application of acids such as citric acid, acetic acid or acidic liquid smoke or combinations thereof. Desirably, this secondary skin will be smooth and cover the surface of the frankfurter. Formation of a liquid layer between the casing and the frankfurter skin facilitates peeling and relates to the meat emulsion formulation, percent relative humidity during the cooking environment, subsequent showering, and steam application to the chilled frankfurter.

Also, application of certain types of coatings to the inside wall of food casings may improve the release characteristics of the casing from the encased sausage product. Use of peeling aids or release coatings has helped to overcome peelability problems associated with process variables. Following cooking, cooling and hydrating, peeling aids such as water-soluble cellulose ethers help release the casing from the frankfurter skin by formation of a peeling enhancing layer between the casing and the frankfurter skin. See U.S. Pat. Nos. 3,898,348 and 4,137,947 for further examples.

These peeling aid coatings have been used with varying degrees of success to provide cellulosic casings capable of being peeled on high speed machine peelers. Generally such cellulosic casings either with or without peeling aid coatings have an approximately neutral pH with pH values typically falling within a range of about 5.9 to about 8.6.

Use of various transferable colorants on food packaging, including cellulosic casing, has been known for some time. Self-coloring casings are disclosed in U.S. Pat. Nos. 2,477,767; 2,477,768 and 2,521,101. These casings are designed to transfer color to the sausage surface. Such casings are generally either coated or impregnated with food grade water-soluble dyes and have also been made commercially available with nontransferable black or white or colored opaque stripes. Also, liquid smoke impregnated fibrous casings are known to transfer liquid smoke to the surface of sausages encased therein, transferring a flavorant or colorant and also causing a browning reaction on the sausage surface.

U.S. Pat. Nos. 2,477,767 and 2,477,768 disclose regenerated cellulose sausage casings uniformly treated with a transferable, edible natural coloring matter. Included in a list of such materials is annatto. The colorant may be applied with glycerine and/or other polyhydric alcohols or vegetable oil. Orange to orange-red sausages are made using self-coloring casings dyed with synthetic colorants such as coal tar dyes that have been approved by government regulation for use on food. These dyes, which are typically known as FD & C dyes, are typically applied to cellulosic casings by dipping gel stock casing into a tank containing an aqueous mixture of glycerine and the FD&C dyes.

In some markets only natural colorants (derived from biological organisms), such as cochineal, turmeric, annatto and caramel are authorized by law and the use of synthetic (fossil-fuel derived or nonbiologically derived) colorants such as coal tar dyes is not allowed. This is especially true for many South American and Asian markets where use of natural red colorants derived from plants or animals are preferred by custom or law.

Another colorant well known in the art is liquid smoke. Liquid smoke solutions are available in a number of formulations. Previously, standard liquid smoke solutions were known as "as-is" solutions, where the liquid smokes were generally highly acidic within a pH range of about 2.0 to about 2.5 and a titratable acidity of at least 3 wt. %, and also contained tar-like components. When used to treat casings, particularly the external surface of a casing, the tar content caused sticky deposits to accumulate on equipment used to treat the casing. The acidity of the liquid smoke also interfered with the peelability of the casing by interfering with the action of the peeling aid used, such as carboxymethyl cellulose. Over time, the low pH liquid smoke also caused the cellulose to degrade, resulting in pinholes and such in the casing itself. In addition, iron contamination caused dark spots on the processed sausages, which were then unacceptable to the consumer.

It was found that tar could be removed from the liquid smoke by neutralizing the "as is" smoke to precipitate the tar, filtering resulting solids, and by adding polysorbate, which solubilized all remaining tars, thereby eliminating the tarry deposit accumulation problem. Further treatment of the casings containing liquid smoke with sodium dihydrogen phosphate is often used to prevent black spotting on the enclosed foodstuffs caused by the iron contamination. Even partial neutralization of the liquid smoke reduces the cellulose degradation problem, and allows the peeling agents to perform as intended, as described in U.S. Pat. No. 4,540,613, which is incorporated herein by reference.

However, because many sausage manufacturers prefer to have a darker colored sausage than that obtainable by processing the meat, meat emulsion, vegetable mixture, or cheese in nonfibrous casing impregnated with liquid smoke, they stuff clear nonfibrous casing with the foodstuff and later drench the stuffed casing, or the released foodstuff, in liquid smoke. This does result in a darker foodstuff, such as a sausage, but at an additional cost, due to the large amounts of liquid smoke needed for drenching or overshowering. Additionally, the equipment used for providing the liquid smoke needs to be thoroughly cleaned to remove tar deposits from it on a regular basis, which can be once a day.

Casings that are well known in the art to be impregnated and therefore contain liquid smoke are fibrous casings. Because they are fibrous reinforced casings, they can be coated with acidic liquid smoke containing low levels of tars or basic liquid smokes with high levels of tars. Additionally, the pinholing and other damage that happens with nonfibrous casing does not occur, due to the reinforced nature of the fibrous casing. However, fibrous casing is not the casing of choice in the production of many sausages and other foodstuffs when the casing must be removed after processing. But where fibrous casing is the casing of choice, enhancement of the smoky red coloring imparted by or through the fibrous casing is often desired by manufacturers, albeit only at low additional costs in processing.

It is an objective of this invention to provide a method of producing sausages and other foodstuffs having good flavor and an acceptably dark smoky color, without the need for using wasteful and expensive amounts of liquid smoke.

All patents cited herein are hereby incorporated by reference.

SUMMARY OF THE INVENTION

The present invention seeks to improve the method of producing darker, smoky colored and flavored food products, comprising the following steps:
a) providing casing impregnated with liquid smoke;
b) stuffing said casing with the desired food product, thereby producing a stuffed casing;
c) treating the stuffed casing with an alkaline solution; and
d) processing the treated stuffed casing thermally to cook said food product.

The resulting food product, such as a sausage, will have a dark smoky color, similar to that seen to foodstuffs processed by a liquid smoke drench and a flavor acceptable to the ultimate consumer.

The preferred casing to be used may be either the fibrous or nonfibrous cellulosic variety, and may contain a peeling aid, if it is desired that the casing be removed from the cooked foodstuff. One embodiment of the invention provides fibrous casings in the form of bags or pouches that have an internal coating of liquid smoke, and that are used to encase whole muscle meats, such as hams, beef, chickens, chicken parts, veal and pork. Such encased meats are then exposed to the alkaline solution and cooked, resulting in a smoky color when the casing is removed. Additionally, instead of cellulosics, plastics or polyamides that have some degree of permeability can be used as casings in the present invention.

It has also been found that the sequence of processing steps may be altered in such a way so that the encased foodstuff is first cooked and then treated with the alkaline solution, in order to obtain the improved, desired natural color.

The pH of the liquid smoke used to impregnate the casing is preferably one that has a pH of between about 4.0 and about 13.0, and most preferably from about 5.0 to about 12.5. It is well known that a pH that is lower than about 4.0 results in casing that is defective in that it develops pin holes and other imperfections over time. A preferred alkaline solution used to treat the stuffed casing is sodium hydroxide ("NaOH"), and the most preferred alkaline solutions are either trisodium phosphate ("TSP") or a mixture of TSP and NaOH. The treatment of the stuffed casing occurs for a short period of time. A preferred treatment time is roughly about one (1) minute, although longer or shorter times are acceptable depending on the desired final color on the processed food stuff. This treatment, be it drenching, showering, dipping, or any other preferred treatment method may occur either before or after the thermal processing of the stuffed casing. It has also been discovered that sausages made in this manner are readily and with surprising ease released from the casing.

Additionally, a clear casing may be used to produce a similar result. The casing is stuffed with the foodstuff, exposed to a liquid smoke, allowed to set, then exposed to the alkaline solution, cooked and then may be released from the casing.

DETAILED DESCRIPTION

The invention is a method for producing a dark, smoky-colored and flavored foodstuff that is processed in cellulosic casing containing liquid smoke, and during the process is exposed to an alkaline solution. The invention also includes the process wherein the casing is clear, but after stuffing, the casing is exposed to liquid smoke that is allowed to set, and then, is exposed to an alkaline solution. In particular, the present invention seeks to improve the method of producing darker, smoky colored and flavored food product, such as sausages, by the following steps:
a) providing casing impregnated with liquid smoke;
b) stuffing said casing with the food product, producing a stuffed casing;
c) treating the stuffed casing with an alkaline solution; and
d) processing the treated stuffed casing thermally to cook said food product The inventive process is particularly useful with small diameter casings, and even more particularly with tubular, nonfibrous, cellulosic casings that are used for processing foodstuffs, such as sausages made of emulsified or coarsely ground meat. After cooking, encased links may be mechanically peeled off and the surface of the link is uniformly colored with a dark, smoky color that does not have a wash or rub-off problem during further processing or after packaging. The same color improvement occurs in foodstuffs prepared in clear casing that is exposed to liquid smoke prior to being treated with the alkaline solution. In addition, the dark, smoky coloring imparted from the liquid smoke impregnated casing is imparted from the casing to the enclosed foodstuff in approximately the same amount of processing time needed to process links (with high speed machinery) using "as is" acidic liquid smoke. The inventive method is also useful in casings, such as fibrous cellulosic casings that, among other things, are produced as larger tubes, bags, or pouches and used to surround whole muscle meat products, such as hams, beef, chickens or chicken parts, veal, and pork, which are then processed in the casings.

The food casings of the present invention may be prepared from tubular casings, particularly non-fibrous casings of cellulose, e.g., regenerated or dissolved cellulose. Some of the well-know methods of producing these casings are the 'viscose' process and the 'amine oxide' process, both well-known in the art. Casings may be made of any suitable cellulosic material including large or small diameter, and seamless or seamed tubular films, as are well-known in the art. In addition, casings that are permeable or semi-permeable, such as those made from plastics or polyamides or any combination thereof, may be used in this invention.

As the term is used herein, "casings" may be planar or tubular films, or may be in the form of pouches or bags. The casings may be wrapped around a foodstuff by any of the well known means in the art.

The manufacture of such casings is well known in the art and one of ordinary skill is aware of the common variations in such parameters as moisture content, type and amounts of such additives as plasticizers, antimycotics, etc. Tubular casings are typically gathered into compressed shirred ("pleated") sticks using well-known processes and equipment. During the shirring operation it is common to coat the casing, particularly the inner surface of a tubular casing, by spraying with a composition termed a "shirr solution" that may contain such ingredients as an anti-pleat lock agent, a lubricant, a surfactant, water and/or a humectant. Some components may serve multiple functions, for example, when lecithin or mineral oil is used, these materials may act as anti-pleat lock agents and as lubricants to facilitate travel of the casing over a shirring mandrel or stuffing horn. Coating with a shirr solution is done to facilitate shirring of the casing and form easily deshirrable, self-sustaining sticks of shirred casing that are adapted for stuffing with products, particularly emulsions that form sausages.

Additionally, liquid smoke having a pH of greater than 4.0, and preferably in the range of from about 4.0 to about 13.0, and most preferably from about 5.0 to about 12.5 is sprayed on the inner surface of the casing, preferably as part of a shirring spray solution. The inner surface of casings also may be coated by other well-known means, one of which is slugging, which is common in the manufacture of fibrous, large diameter casings. Application of other additives and coating compositions via solution spraying is convenient, economical and facilitates placement of a regular measured distribution of a coating on the casing surface. For example, peeling aids such as carboxymethyl cellulose ("CMC") may be added in the shirr spray as is taught in the art. Casings useful in the present invention and well known in the art are manufactured by Viskase Corporation, located in Willowbrook, Ill., USA, and known as the NOJAX® and EZ PEEL®, and Hydroflex® brands of small diameter casings.

One of the primary components of a preferred mode of the inventive process is a casing impregnated with liquid smoke. Although both partially neutralized and neutralized liquid smokes are acceptable, preferably a neutralized, concentrated, tar-depleted liquid smoke (see U.S. Pat. Nos. 4,356,218, 4,511,613, 4,540,613 and 4,818,551) is used to provide the alkaline smoke color and flavor. The casings may be treated with phosphates to inhibit discoloration and black spot formation on the casing, as disclosed in the above patents. Neutralized liquid smoke was developed to avoid certain problems inherent in the use of acidic compounds, plus the problem seen with acidic liquid smokes having to do with the tar components. Although it is well known that an acidic liquid smoke delivers, after cooking under low humidity conditions, a deep reddish-smoky color to the surface of sausages treated with it, it is also well-known in the art that acidic liquid smoke interferes with the water soluble cellulose ethers, such as CMC, that are used as peeling aids, making it very difficult, if not impossible, to mechanically remove the spent casing cleanly, without damaging the sausages encased within, using a high speed peeler. Acidic liquid smoke also causes, in time, cellulose degradation in the casing, thereby weakening it for the sausage manufacturer. For the customer, acidic smokes are hard on equipment and pose environmental pollution issues in some geographical areas. In contrast, neutralized, concentrated, tar-depleted liquid smoke, under more productive higher humidity conditions, delivers less of the desired reddish-smoky color to the encased sausages. However, as the pH of the liquid smoke reaches a pH from about 4.0 to about 9.0 and has a titratable acidity of less than about 6%, the peeling action of the cellulose ether remains almost unaffected by the neutralized liquid smoke, and a reduction of cellulose degradation is seen, thereby making the casing acceptable from a mechanical handling viewpoint. Therefore, the preferred pH range of the liquid smoke used to coat the casing is from about a pH of 4.0 to about 13.0, and most preferably from about 5.0 to about 12.5. This same liquid smoke may also be used for drenching, spraying or otherwise exposing stuffed, clear casing to liquid smoke. Acidic liquid smoke, that is liquid smoke with a pH below about 4.0, is also acceptable for this use.

Beneficially, additional components to the casing as a coating include well-known ingredients such as: an antioxidant color stabilizer such as a tocopherol, ascorbate, or sodium erythorbate; glycerine, propylene glycol, or oils, such as vegetable oil, added to promote spreading of the coloring on the casing surface and enhance uniformity of color transfer to the sausage surface; surfactants such as lecithin, polysorbates including polyoxyethylene (20) sorbitan monolaurate, or ethoxylated monodiglycerides may be employed to facilitate uniformity, spreadability, and/or transferability of the liquid smoke from the casing to the encased foodstuff.

The preferred coating composition of this invention is a combination of coloring agents, shirring solution, and optionally peeling aids, and is applied in one step, instead of in multiple steps or layers. However, typical commercially used shirring solution and peeling aid compositions may be applied as the first inner layer, with the liquid smoke layer being applied as the second inner layer.

The amount of coating composition applied to the casing will typically be from about 350 to about 1200 mg. coating/100 in$^2$ of coated casing surface. The coating may be applied during shirring as a spray. Alternatively, the liquid smoke containing coatings may be applied to gel stock casing by slugging, dipping, or coating prior to drying, or by slugging semi-finished casing after drying and prior to shirring. Slugging or a combination of slugging and spraying may enhance uniformity of the coating on the casing during shirring.

Also, the liquid smoke containing coatings may be applied to dissolved cellulose or a cellulose derivative prior to tube formation, e.g., in viscose, in order to produce colored casing. Although it is expected that some liquid smoke would be entrapped within the casing and not transfer, it is also believed that the liquid smoke located on the inner surface of the casing will transfer. In general, tubular casings of the present invention will contain sufficient liquid smoke to color the foodstuff surface uniformly and to a visually perceptible color intensity. Such intensity will vary according to customer tastes in the marketplace. Suitable concentrations of liquid smoke will depend on the preferences of the customer, but for example, shirring solutions containing neutralized liquid smoke are sprayed onto the inner surface of the casing at a concentration of from about 450 to about 1100 mg/in$^2$ of casing surface. Shirring solutions having lesser amounts of neutralized liquid smoke will produce decreased color intensity, while greater amounts will produce a more intense color. Generally, the amount of liquid smoke used in the casing will be in the range of about 75 wt. % of the shirring solution, with a preferred composition of the invention having at least 50 wt. % and less than about 90 wt. %.

Another factor known to be especially important in affecting the suitability of shirred casing sticks for use with automatic food stuffing equipment is the durability or coherency of the shirred stick as a self-sustaining article. A disjunction or break in the shirred stick prior to mounting on the stuffing apparatus may make the stick unsuitable for use. Accordingly, any treatment such as the application of a coating to a tubular food casing that is to be formed into shirred casing sticks must be considered in light of its effect on coherency. Advantageously, such coatings will assist in formation of shirred sticks of casing which have sufficient coherency to hold together from immediately after shirring through shipping and ultimate use, while allowing the shirred casing to be easily deshirred during stuffing operations without production of casing defects such as holes or tearing and without requiring undue force thereby minimizing such defects.

In the preferred inventive process, once the liquid smoke containing casings are stuffed with the foodstuff of choice, they are then subjected to a drenching with an alkaline solution. A preferred alkaline solution is one of an aqueous NaOH solution having a concentration in the range of from about 0.2% to about 1.5%. Another preferred aqueous alkaline solution is that of anhydrous TSP at a concentration from about 1% to about 5%, or up to about 11%, which is saturation. Mixtures of the two have also shown effects on the color produced in this method. Depending on the liquid smoke used, it was shown that generally, the use of TSP produces a redder product, while a more brown color can be produced by using the NaOH drench. It was also discovered that with certain liquid smokes, the load of the smoke on the casing can be reduced when any of the alkaline showers are used, and a gain in darkness is still seen, one that makes up for the loss normally seen with the reduction of liquid smoke loading. A mixture of alkaline agents, such as NaOH and TSP can be used, in so far as balancing color development in both the darkness and redness scales. However, the most preferred alkaline solution is the aqueous 5% TSP solution for ease of use in a manufacturing plant, as most food processing plants are already experienced in working with TSP as a cleaning agent.

Other types of aqueous alkaline solutions may be used in this invention, such as sodium metasilicate, potassium hydroxide or calcium hydroxide. However, as both NaOH and TSP have Generally Recognized As Safe status under FDA rules and regulations, it is believed that these two chemicals are among the most useful or compatible in food processing plants today.

Drenching the stuffed casings with an alkaline solution has been shown to produce maximum color change in the encased foodstuffs, when it is done prior to the cooking step in the manufacturing process. Color change has also been seen when it is performed after the cooking step, but not to the degree seen when performed earlier. And, as manufacturing concerns are taken into consideration, using liquid smoke impregnated or coated casings and drenching such stuffed casing with an alkaline solution replaces the step of drenching clear stuffed casing with expensive liquid smoke. In this regard, no new steps are introduced into the manufacturing process. However, if the manufacturer prefers to use a clear casing, stuffs it, and then exposes the stuffed casing to liquid smoke in any acceptable way, it may then be drenched with the alkaline solution, or cooked and then drenched with the alkaline solution, prior to releasing the foodstuff from the casing, if the foodstuff is to be released.

Another surprising result of the present invention is that peeling of encased sausages treated by the inventive method was shown to be much easier than sausages produced without the alkaline treatment. In fact, in side-by-side comparisons with a low pH citric acid shower, which was believed to enhance redness in the processed product, it was shown that the citric acid showered stuffed casings were more adhesive to the encased sausages, and produced surface scaring in hand-peeled sausages, whereas the alkaline drenched sausages were easily and completely peeled from their skins, to the point where the skins almost slipped off the sausages.

The measurement of color is done using the Hunter L, a, b standard color scale, which is described below. The following test method is used in this application and examples.

L, a, b Test

Hunter L, a, b values are standard color scale values that indicate differences in brightness, hue and saturation using a standard color system which relates lightness as L values, and hue and croma as a combination of a and b values on a coordinate scale, where a represents redness-greenness and b represents yellowness-blueness.

L values describe the degree of darkness, where a value of 100 equals white and that of 0 equals black.

a-values describe the degree of redness, which increases with an increasing a-value.

b-values describe the degree of yellowness, which increases with increasing b-value.

L, a, b and opacity theory and measurement are further described in the *Instruction Manual Hunter Lab 45°/0° D25-PC2ΔColorimeter*, pp. 1-1 through index-5. (Hunter Associates Laboratory, Inc., April, 1988). Hunter L, a, b and color scale values and opacity may be measured by the following tests.

Encased or peeled frankfurters may be tested as is. L, a, b values and opacity are measured using a colorimeter such as a Hunter D25-PC2Δ calorimeter available from Hunter Associate Laboratory, Inc. of Reston, Va., U.S.A. or the Color Machine Model 8900 available from Pacific Scientific.

Samples are placed on the sample plane of the calorimeter (which is calibrated using standard tiles according to the manufacturer's instructions) where a 45° incident light from a quartz-halogen lamp (clear bulb) illuminates the sample. An optical sensor placed at 0° (perpendicular to the sample plane) measures the reflected light which is filtered to closely approximate CIE 2° Standard Observer for Illuminant C. Values are reported using a standard Hunter L, a, b color scale.

Sausage sample placement is accomplished as follows. The sausage is held in close contact against the sample port that is equipped with a sample port insert having an appropriately sized aperture. The aperture should be no larger than the area to be sampled, typically a circular opening about 0.5 inches in diameter. L, a, b values are measured. Three measurements per frankfurter are made and five frankfurters are tested.

The invention will become clearer when considered together with the following examples which are set forth as being merely illustrative of the invention and which are not intended, in any manner, to be limitative thereof. Unless otherwise indicated, all parts and percentages are by weight.

Stuffing, Color and Peeling Tests

Various shirred sausage casings were made using the compositions described in the examples below. The clear positive control casing was a small diameter nonfibrous cellulose casing having a peeling aid, which is marketed under the trademark E-Z PEEL NOJAX® Casing by Viskase Corporation, Willowbrook, Ill., USA.

Commercially produced, nonfibrous, small diameter casings of regenerated cellulose made from viscose were used to prepare all of the casings of these examples, known as NOJAX® casing, made by Viskase Corporation. The casings were coated by spraying the internal surface of the casing with the formulations from the examples below while shirring of the casing was taking place. The finished casings were used as shirred sticks of casing and identified as "EZ Smoke®", a registered trademark of Viskase Corporation, Willowbrook, Ill., U.S.A.

These test shirred sticks of casing were stuffed with meat emulsions on a high speed FAM mechanical stuffer, which formed individual links as the casings were being stuffed. The links of sausages were processed as they would be in a commercial manufacturer's factory, using heat, humidity, and cook cycle times consistent with processing a meat emulsion product, unless described differently in the example. Once the links finished cooking, the casing was then slit by hand and the released links were examined for defects due to the inability of the casing to be removed from the finished links. Marring of the surface of the links or chunks of meat torn from them are some of the defects that are possible when peeling is poor. Commercially acceptable casing must release the sausages without damage at greater than 99% of the time. The links were also tested for L, a, b values.

EXAMPLE 1

Timing of Exposure; Basic vs. Acidic Dip

The solutions used in this example was prepared as follows.

A. Shirring Solution Containing Liquid Smoke.

Small diameter, cellulose casing was shirred using the following shirring formulation, which included a partially neutralized liquid smoke, per the following composition given in the terms of the casing loading in mg/100 in$^2$. The components of the formulation were:

TABLE 1

Shirring Solution

| Ingredients | mg/100 in$^2$ |
|---|---|
| distilled water (DI Water) | 130.63 |
| CMC, from Hercules, Inc., known as 7LF | 5.32 |
| liquid smoke*, initial pH of 5.38 | 790.97 |
| sodium dihydrogen phosphate monohydrate | 2.85 |
| Slip Ayd ® SL535E ** | 18.34 |
| Tween ® 80 | 0.95 |
| sodium erythorbate monohydrate | 0.95 |
| Total | 950.01 |

\* from Hickory Specialties, Inc. of Brentwood Tennessee, USA
\*\* manufactured by Elementis Specialties, Inc., a carnauba wax emulsion This formulation was used as the shirring solution and sprayed on the interior of the EZ Smoke® casing.

B. Alkaline Solutions

Alkaline solutions were prepared by dissolving in water the appropriate amount of 50% NaOH to make 0.5, 1.0, and 5.0% by weight solutions and the citric acid solution was made similarly using anhydrous citric acid.

C. Details of the Experiment

Sausages were processed in these casings as prepared above, according to the procedure given below. A composition comprising substantially turkey, pork and beef was emulsified and then stuffed into the casings using a mechanical stuffing apparatus. After stuffing, six to eight contiguous links of the stuffed products simultaneously were dipped in the various caustic or acid solutions for one minute at the desired stages of the thermal processing cycle. One minute was selected for the dipping time as a preliminary test visually indicated color was fully developed on stuffed links without excessive extraction of liquid smoke at the one minute mark. Dipping was done at one of the following points in the process: a) after stuffing, b) after the first cook zone, c) after the second cook zone, and d) after the third cook zone. The dipped links were then hung on racks, placed in a smokehouse, and thermally processed using the following schedule:

TABLE 2

Thermal Processing

| Step | Dry Bulb (° F.) | Wet Bulb (° F.) | Relative Humidity (%) | Time (min.) | Cook Cycle |
|---|---|---|---|---|---|
| Cook Zone 1 | 173 | 102 | 10 | 20 | Cook |
| Cook Zone 2 | 197 | 124 | 14 | 20 | Cook |
| Cook Zone 3 | 195 | 179 | 70 | 20 | Cook |
| 4 | 138 | 138 | 100 | 5 | Hot Water Shower |
| 5 | — | — | — | 20 | Shower |
| 6 | — | — | — | 3–5 | Ice/Water Dip |

The final products were soaked in ice water, hand peeled, and the L, a, and b colorimetric values were obtained immediately after peeling using the Pacific Scientific Color Machine. An average value was determined for each condition from 15 readings (3 readings each on 5 peeled links). Products for the various color evaluations were pulled from the same stuffed stick to minimize stick to stick differences.

Results of the Pacific Scientific Color Machine readings are given in the following table:

TABLE 3

Acid and Caustic Overshower Color Effects by Solution Concentration in Each Cookhouse Zone

| Description | L-Values Control | Citric Acid | Caustic | A-Values | Citric Acid | Caustic | B-Values Control | Citric Acid | Caustic |
|---|---|---|---|---|---|---|---|---|---|
| Clear | 52.11 | | | 10.24 | | | 17.03 | | |
| E-Z Smoke | 47.35 | | | 13.14 | | | 18.26 | | |
| 0.5% drench | | 47.9 | 44.81 | | 13.03 | 13.53 | | 18.66 | 18.42 |
| 1% drench | | 48.31 | 43.13 | | 12.88 | 13.7 | | 18.48 | 18.61 |
| 5% drench | | 48.19 | 42.01 | | 12.78 | 11.56 | | 18.27 | 17.81 |

TABLE 3-continued

Acid and Caustic Overshower Color Effects by Solution Concentration in Each Cookhouse Zone

| Description | L-Values Control | Citric Acid | Caustic | A-Values | Citric Acid | Caustic | B-Values Control | Citric Acid | Caustic |
|---|---|---|---|---|---|---|---|---|---|
| 0.5% First Zone | 46 | 44.37 | | 13.59 | 14.37 | | 18.26 | 18.25 | |
| 1% First Zone | 47.16 | 45.45 | | 13.19 | 13.72 | | 18.15 | 18.58 | |
| 5% First Zone | 47.78 | 41.48 | | 12.85 | 13.4 | | 18.18 | 17.68 | |
| 0.5% Second Zone | 48.37 | 46.17 | | 12.83 | 13.54 | | 18.35 | 18.88 | |
| 1% Second Zone | 48.26 | 46.15 | | 12.85 | 13.34 | | 18.52 | 18.75 | |
| 5% Second Zone | 48.02 | 44.45 | | 12.98 | 11.72 | | 18.57 | 18.04 | |
| 0.5% Third Zone | 47.58 | 45.51 | | 13.03 | 13.56 | | 18.42 | 18.54 | |
| 1% Third Zone | 47.34 | 46.67 | | 13.16 | 12.75 | | 18.37 | 18.52 | |
| 5% Third Zone | 47.77 | 43.32 | | 13.06 | 12.41 | | 18.63 | 17.86 | |

Data indicates that citric acid treatments do not have a measurable effect on any of the color parameters, whereas the caustic dips dramatically darken ("L-value") and reduce the redness ("a-value") of the final products. Although effective at all concentrations and stages of the process, the caustic dips are more effective at higher concentrations and slightly more effective earlier in the process.

Hand peeling was also affected by the dip treatments. All citric acid dips reduced peelability, the casing adhering to the meat surface strongly enough to cause some surface scarring. All caustic dips enhanced peeling compared to the non-treated controls, the meat exhibiting complete casing release.

EXAMPLE 2

Liquid Smoke and Alkaline Dip Variations

A series of small diameter, cellulose casings impregnated (loaded) with shirring solutions having various liquid smoke concentrations were prepared, having been shirred with shirr solutions having the following compositions, including partially neutralized liquid smoke having an initial pH of 5.0. The measurements are the same as in Example 1, that is in terms of the casing loading in mg/100 in$^2$:

TABLE 4

Liquid Smoke Containing Shirring Solutions

| | A | B | C | D |
|---|---|---|---|---|
| DI Water | 123.75 | 123.75 | 123.75 | 415.13 |
| Hickory Specialties liquid smoke | 749.25 | 541.13 | 291.38 | 0 |
| Carboxymethyl cellulose 7LF | 5.04 | 5.04 | 5.04 | 5.04 |
| Sodium dihydrogen phosphate monohydrate | 2.7 | 2.7 | 2.7 | 2.7 |
| sodium erythorbate monohydrate | 0.9 | 0.9 | 0.9 | 0.9 |
| Slip Ayd ® SL535E | 17.37 | 17.37 | 17.37 | 17.37 |
| Tween 80 | 0.9 | 0.9 | 0.9 | 0.9 |
| Total | 899.91 | 691.79 | 442.04 | 442.04 |

Casing dip solutions were made by dissolving the appropriate amount of 50% NaOH in water to prepare 0.5, 1.0, and 1.5% NaOH solutions by weight. The TSP was made by dissolving anhydrous TSP in water to 5% by weight. The pH of the NaOH solutions varied from 13.0 to 13.5, while that of the 5% TSP was at 12.4.

The same emulsion composition was used as described in Example 1 and was stuffed into the prepared casing as above. Approximately ten contiguous links were simultaneously dipped in the various concentrations of NaOH and the 5% TSP solutions for one minute after stuffing and before any thermal processing. Treated casings were hung on racks and thermally processed using the same smokehouse schedule used in Example 1.

The final products were soaked in ice water, hand peeled, and the L, a, and b colorimetric values were obtained immediately after peeling as above. An average value was determined for each condition from 15 readings (3 readings each on 5 peeled links). The E values (square root of the sum of squares of L, a, and b) were calculated as a measure of total color development. Products for the various color evaluations were pulled from the same stuffed stick to minimize stick to stick differences.

Results of colorimetric testing are given in Table 5 below:

TABLE 5

Smoke Load with Various Concentration NaOH and 5% TSP Overshowers

| Smoke Load (1) (mg/100 in$^2$) | Shower Treatment | L | a | b | E (2) |
|---|---|---|---|---|---|
| 900 | none | 46.59 | 16.5 | 15.69 | 51.9 |
| | 0.5% NaOH | 40.67 | 15.84 | 16.25 | 46.6 |
| | 1.0% NaOH | 38.26 | 13.97 | 15.7 | 43.7 |
| | 1.5% NaOH | 38.01 | 13.88 | 15.52 | 43.3 |
| | 5% TSP | 40.77 | 16.45 | 15.5 | 46.6 |
| 692 | none | 46.64 | 16.44 | 14.44 | 51.5 |
| | 0.5% NaOH | 42.62 | 15.09 | 15.5 | 47.8 |
| | 1.0% NaOH | 38.27 | 13.7 | 15.09 | 43.4 |
| | 1.5% NaOH | 38.76 | 13.69 | 15.37 | 43.9 |
| | 5% TSP | 42.16 | 16.34 | 14.91 | 47.6 |

TABLE 5-continued

Smoke Load with Various Concentration
NaOH and 5% TSP Overshowers

| Smoke Load (1) (mg/100 in²) | Shower Treatment | L | a | b | E (2) |
|---|---|---|---|---|---|
| 442 | none | 47.93 | 16.17 | 14.11 | 52.5 |
|  | 0.5% NaOH | 43.26 | 15.14 | 15.07 | 48.2 |
|  | 1.0% NaOH | 41.65 | 13.54 | 15.25 | 46.4 |
|  | 1.5% NaOH | 41.9 | 12.39 | 15.3 | 46.3 |
|  | 5% TSP | 43.92 | 15.8 | 14.73 | 48.9 |
| 0 | none | 48 | 16.55 | 12.56 | 52.3 |
|  | 0.5% NaOH | 48.44 | 14.65 | 12.97 | 52.2 |
|  | 1.0% NaOH | 45.89 | 13.66 | 13.25 | 49.7 |
|  | 1.5% NaOH | 45.68 | 12.73 | 13.46 | 49.3 |
|  | 5% TSP | 46.02 | 15.29 | 13.08 | 50.2 |

(1) Liquid smoke is 83% of the shirring solution load given
(2) $E = (L^2 + a^2 + b^2)^{1/2}$ as a measure of total color As the above data show, increased smoke load alone provided a slightly darker, more yellow color, but does not effect overall redness. Significant color changes were provided by interaction of the smoke load and the alkaline dips.

At each level of smoke treatment, product darkening was obtained from all dip treatments, with the 0.5% NaOH and 5% TSP dips performing nearly the same.

The higher concentration NaOH treatments provided additional darkening and performed similarly.

All NaOH treatments reduced the product redness, providing a more brown coloration.

The 5% TSP treatment retained the redness of the samples not treated with any dip solution (the controls) at the higher liquid smoke treatment levels.

The yellow values were increased over that of the control liquid smoke but were not significantly different among the treatments.

The total color as measured by the E value also indicates parity between the 0.5% sodium hydroxide and 5% TSP treatments.

EXAMPLE 3

Use of Clear Casing

Standard clear (non-smoke containing) casing as described in Example 1 is processed according to the conditions in Experiment 2, except that the stuffed links are hung in a smoke showering cabinet and drenched for 1 minute 20 seconds with liquid smoke having an initial pH of 5.0, diluted to 80% of its initial strength with water. The excess liquid smoke is allowed to drip from the links, and 8–10 contiguous links are subjected to a 5% TSP dip for one minute. The change in sausage color is expected to be similar to that achieved from the casing control containing liquid smoke at 900 mg/100 in² casing loading after dipping in 5% TSP for one minute under the same processing conditions.

EXAMPLE 4

Peelability and Color

The clear casing and the casing of Example 1 were used to test peelability and color development of alkali showered sausages. A casing having no peeling agent was included as a negative control. Sticks were filled with a tough-to-peel high collagen frankfurter emulsion consisting of:

TABLE 6

| Ingredient | Weight (lbs) |
|---|---|
| Boneless Beef Chuck (85% Lean) | 22.0 |
| Regular Pork Trimmings (40% Lean) | 30.0 |
| Boneless Beef Shank (85% Lean) | 16.0 |
| Beef Cheek | 16.0 |
| Beef Tripe | 16.0 |
| Ice/Water | 22.0 |
| Salt | 2.25 |
| Prague Powder (Curing Salt) | 0.25 |
| Sodium Erythorbate | 0.05 |

Note: Lean percentages are approximate.

The emulsion was processed and stuffed into the casings using a stuffing machine. The stuffed products were showered with the alkaline solutions for ninety seconds and thermally processed using the following smokehouse schedule:

TABLE 7

Smokehouse Schedule

| Step | Dry Bulb (° F.) | Wet Bulb (° F.) | Relative Humidity (%) | Time (min.) | Cook Cycle |
|---|---|---|---|---|---|
| Cook Zone 1 | 140 | 99 | 25 | 5 | Cook |
| Cook Zone 2 | 150 | 106 | 24 | 6 | Cook |
| Cook Zone 3 | 160 | 114 | 25 | 6 | Cook |
| 4 | 170 | 121 | 25 | 6 | Cook |
| 5 | 180 | 128 | 25 | 45 | Cook |
| 6 | Ambient Water Temperature | | | 15 | Cold Tap Water Shower |
| 7 | 25° F. | | | 15 | Brine Chill |

After the brine chilling, the sausages were peeled using a mechanical peeler set at half its maximum rate with 40 psi steam pressure. The combination of emulsion type, cookhouse schedule, and peeler parameters was designed to give peelability in the 50–60% range with smoked casing processed sausages. Strands of approximately 120 links were manually fed to the peeler and all links were collected in pans. The number of peeled and unpeeled links were counted and the percent sausages peeled was calculated.

Results of the peeling evaluation are given in Table 8 below.

TABLE 8

Peeling

| | % Peelability | |
|---|---|---|
| | Clear | Casing with Liquid Smoke |
| Clear casing - no alk. treatment | 94.6 | |
| Clear casing - 1% TSP | 95.6 | |
| Clear casing - 1% NaOH | 97.1 | |
| Liq. Smoke Casing - No alk. treatment | | 53.9 |
| Liq. Smoke Casing- 1% TSP | | 58.6 |
| Liq. Smoke Casing- 1% NaOH | | 72.1 |

Data indicates that the peelability was improved over the non-treated casing for both clear and nonfibrous casings containing liquid smoke, with the NaOH dips improving peeling by a greater margin than the TSP treatment. As the smoked casings are traditionally harder to peel in this test, the gain in peelability is higher for these products.

The sausages made from this emulsion type also showed color enhancement due to the alkaline dips as indicated in the following table:

TABLE 9

Color Effects

| Casing | L | a | b |
| --- | --- | --- | --- |
| Clear - No Smoke | 52.98 | 14.3 | 14.19 |
| SMOKED - No Treatment | 50 | 15.82 | 15.96 |
| SMOKED - 1% TSP Dip | 48.58 | 16.18 | 15.85 |
| SMOKED - 1% NaOH Dip | 45.43 | 11.43 | 16.78 |

EXAMPLE 5

Comparison of Alkaline Solutions

The casing, emulsion type, and processing conditions of Example 1 were used with one minute dips of NaOH, TSP, and combinations of NaOH and TSP. Data in the table below indicates that the color effects are additive and that the dip composition can be altered to modify target finished product colors. Additionally, TSP had no discernible effect on either the a-value or the b-value.

TABLE 10

Combined Sodium Hydroxide/TSP Dip Effects

| Casing Type (1) | Dip Composition | L | a | b |
| --- | --- | --- | --- | --- |
| Clear Control | none | 51.34 | 14.58 | 12.98 |
| EZ Smoke Control | none | 49.42 | 15.25 | 15.54 |
| EZ Smoke | 0.5% Caustic Dip | 46.16 | 13.81 | 16.56 |
| EZ Smoke | 1.0% Caustic Dip | 44.63 | 11.50 | 16.56 |
| EZ Smoke | 0.5% Caustic/2.5% TSP Dip | 45.03 | 12.01 | 16.55 |
| EZ Smoke | 0.5% Caustic/5% TSP Dip | 44.91 | 11.93 | 16.92 |
| EZ Smoke | 1% Caustic/5% TSP Dip | 43.75 | 12.41 | 16.94 |
| EZ Smoke | 5% TSP Dip | 47.02 | 15.22 | 15.90 |
| Clear Drench Control | 2 Minute tar free liquid smoke | 42.16 | 17.29 | 17.64 |

What is claimed is:

1. A method of coloring a food product comprising:
   a) providing a casing impregnated with liquid smoke;
   b) stuffing said casing with said food product thereby producing a stuffed casing;
   c) treating said stuffed casing with an aqueous alkaline solution; and
   d) processing said treated stuffed casing thermally.

2. A method according to claim 1, wherein said casing is cellulosic or polymeric.

3. A method according to claim 1, wherein said casing is cellulosic.

4. A method according to claim 3, wherein said casing is fibrous or nonfibrous.

5. A method according to claim 4, wherein said casing is nonfibrous.

6. A method according to claim 1, additionally comprising releasing said food product from said casing.

7. A method according to claim 1, wherein said food product is selected from the group consisting of a meat emulsion, a ground meat composition, a meat and vegetable composition, processed soy beans, a processed vegetable mixture, ham, beef parts, chicken parts, veal parts and pork parts.

8. A method according to claim 7, wherein said food product is a meat emulsion or a ground meat composition.

9. A method according to claim 1, wherein said liquid smoke has a pH of from about 4.0 to about 13.0.

10. A method according to claim 1, wherein said liquid smoke has a pH of from about 5.0 to about 12.5.

11. A method according to claim 1, wherein said alkaline solution is selected from the group consisting of an aqueous solution of sodium hydroxide, an aqueous solution of trisodium phosphate, and mixtures thereof.

12. A method according to claim 11, wherein said sodium hydroxide is present in a concentration of from about 0.2 wt % to about 1.5 wt. %.

13. A method according to claim 11, wherein said aqueous trisodium phosphate is present in a concentration of from about 1 wt. % to about 11 wt. %.

14. A method according to claim 1, wherein said treating is selected from the group consisting of spraying, drenching, and dipping.

15. A method of coloring a food product comprising:
   a) providing a casing impregnated with liquid smoke;
   b) stuffing said casing with said food product thereby producing a stuffed casing;
   c) processing said stuffed casing thermally; and
   d) treating said thermally processed stuffed casing with an aqueous alkaline solution.

16. A method according to claim 15, wherein said casing is cellulosic or polymeric.

17. A method according to claim 15, wherein said casing is cellulosic.

18. A method according to claim 17, wherein said casing is fibrous or nonfibrous.

19. A method according to claim 18, wherein said casing is nonfibrous.

20. A method according to claim 15, additionally comprising releasing said food product from said casing.

21. A method according to claim 15, wherein said food product is selected from the group consisting of a meat emulsion, a ground meat composition, a meat and vegetable composition, processed soy beans, a processed vegetable mixture, ham, beef parts, chicken parts, veal parts and pork parts.

22. A method according to claim 15, wherein said food product is a meat emulsion or a ground meat composition.

23. A method according to claim 15, wherein said liquid smoke has a pH of from about 4.0 to about 13.0.

24. A method according to claim 15, wherein said liquid smoke has a pH of from about 5.0 to about 12.5.

25. A method according to claim 15, wherein said alkaline solution is selected from the group consisting of an aqueous solution of sodium hydroxide, an aqueous solution of trisodium phosphate, and mixtures thereof.

26. A method according to claim 25, wherein said sodium hydroxide is present in a concentration of from about 0.2 wt. % to about 1.5 wt. %.

27. A method according to claim 25, wherein said trisodium phosphate is present in a concentration of from about 1 wt. % to about 11 wt. %.

28. A method according to claim 15, said treatment is selected from the group consisting of spraying, drenching, and dipping.

29. A method of coloring a food product comprising:
   a) providing a casing free of liquid smoke;
   b) stuffing said casing with said food product to produce a stuffed casing;
   c) treating said stuffed casing with a solution of liquid smoke;

d) processing said liquid smoke treated stuffed casing thermally thereby producing a thermally processed stuffed casing; and e) treating said thermally processed stuffed casing with an aqueous alkaline solution.

30. A method according to claim 29, wherein said casing is cellulosic or polymeric.

31. A method according to claim 30, wherein said casing is cellulosic.

32. A method according to claim 31, wherein said casing is fibrous or nonfibrous.

33. A method according to claim 32, wherein said casing is nonfibrous.

34. A method of coloring a food product comprising:

a) providing a casing free of liquid smoke;

b) stuffing said casing with said food product to produce a stuffed casing;

c) treating said stuffed casing with a solution of liquid smoke to produce a smoked stuffed casing;

d) treating said smoked stuffed casing with an aqueous alkaline solution to produce a treated smoked stuffed casing; and e) processing said treated smoked stuffed casing thermally.

35. A method according to claim 34, wherein said casing is cellulosic or polymeric.

36. A method according to claim 35, wherein said casing is cellulosic.

37. A method according to claim 36, wherein said casing is fibrous or nonfibrous.

38. A method according to claim 37, wherein said casing is nonfibrous.

* * * * *